United States Patent
Huang et al.

(10) Patent No.: US 8,514,731 B2
(45) Date of Patent: Aug. 20, 2013

(54) VARIABLE-FREQUENCY NETWORK DEVICE AND VARIABLE-FREQUENCY NETWORK CONNECTION ESTABLISHING METHOD

(75) Inventors: Liang-Wei Huang, Taipei (TW);
Chun-Wen Yeh, Yonghe (TW);
Chien-Sheng Lee, Houlong Town (TW);
Tsung-Cheng Lee, Dapi Township (TW)

(73) Assignee: Realtek Semiconductor Corp., Hsinchu (TW)

( * ) Notice: Subject to any disclaimer, the term of this patent is extended or adjusted under 35 U.S.C. 154(b) by 550 days.

(21) Appl. No.: 12/648,966

(22) Filed: Dec. 29, 2009

(65) Prior Publication Data

US 2010/0166009 A1    Jul. 1, 2010

(30) Foreign Application Priority Data

Dec. 31, 2008  (TW) ............................... 97151635 A
Jan. 6, 2009   (TW) ............................... 98100183 A (51) Int. Cl.
  *H04L 12/66* (2006.01)
(52) U.S. Cl.
  USPC ........................... 370/252; 370/410; 370/463

(58) Field of Classification Search
  USPC ................... 370/252, 254, 401, 410, 463, 466
  See application file for complete search history.

(56) References Cited

U.S. PATENT DOCUMENTS

| 6,665,310 B1 * | 12/2003 | Nakatsugawa ................ 370/442 |
| RE39,116 E | 6/2006 | Shirani et al. |
| RE39,405 E | 11/2006 | Edem et al. |
| 2006/0045212 A1 * | 3/2006 | Ishii et al. ..................... 375/340 |

* cited by examiner

*Primary Examiner* — Kevin C Harper
*Assistant Examiner* — Mon Cheri Davenport
(74) *Attorney, Agent, or Firm* — McClure, Qualey & Rodack, LLP (57) ABSTRACT

A variable-frequency network connection establishing method is adapted for establishing a connection between a local network device and a remote network device. The variable-frequency network connection establishing method includes the steps of: providing a plurality of local communications protocols including a local standard communications protocol and a local variable-frequency communications protocol to the remote network device; receiving a remote communications protocol provided by the remote network device; generating an indicator signal in accordance with the remote communications protocol and the plurality of local communications protocols; and operating in one of a standard mode and variable-frequency mode according to the indicator signal.

29 Claims, 3 Drawing Sheets

VARIABLE-FREQUENCY NETWORK DEVICE AND VARIABLE-FREQUENCY NETWORK CONNECTION ESTABLISHING METHOD

CROSS-REFERENCE TO RELATED APPLICATION

This application claims priority of Taiwanese application no. 097151635, filed on Dec. 31, 2008, and Taiwanese application no. 098100183, filed on Jan. 6, 2009.

BACKGROUND OF THE INVENTION

1. Field of the Invention

This invention relates to a network device and a network connection establishing method, more particularly to a variable-frequency network device and a variable-frequency network connection establishing method.

2. Description of the Related Art

Generally, Ethernet connection rates are measured in units of ten, such as the connection rates of 10 Mbps, 100 Mbps, 1 Gbps, and 10 Gbps that are defined in Ethernet standard specifications. A network device must conform to one of these connection rates in order to establish a connection with a remote network device through an Ethernet network.

However, when these network devices are connected to a host, the connection rate is often restricted by a transmission rate of a data transmission interface (host interface) between the network devices and the host, since the transmission rate of the data transmission interface cannot be exactly the same as the connection rate at which the network devices themselves are capable of operating. For instance, the transmission rates of a PCI interface are 133 Mbps, 166 Mbps, etc., the bidirectional transmission rates of a PCI-E interface are 2.5 Gbps and 5 Gbps, and the transmission rate of a USB interface is 480 Mbps. As such, when the connection rate of the network device is different from the transmission rate of the data transmission interface, such as when the connection rate of the network device is 1 Gbps, and the transmission rate of the data transmission interface is that of the PCI interface, that is, 133 Mbps, the connection rate is restricted by the transmission rate of the data transmission interface. On the other hand, when the connection rate of the network device is for instance 2 Gbps, and the transmission rate of the data transmission interface is that of the PCI-E interface, that is, 2.5 Gbps, the transmission rate of the data transmission interface is restricted by the connection rate of the network device. The above-described situations thus result in inefficient utilization of either transmission rate capability or connection rate capability.

SUMMARY OF THE INVENTION

Therefore, an object of the present invention is to provide a variable-frequency network connection establishing method capable of providing overclocking and downclocking connection rates in addition to a standard connection rate, and a variable-frequency network device capable of performing the method.

According to one aspect of the present invention, there is provided a variable-frequency network device adapted for establishing a connection with a remote network device through a network cable. The variable-frequency network device comprises a physical layer circuit and a variable-frequency clock generator. Preferably, the variable-frequency network device further includes a media access controller and a host interface controller.

The physical layer circuit is for transmitting packets to the remote network device and receiving packets that are outputted by the remote network device. The physical layer circuit includes a communications protocol exchanging circuit and a connection rate control circuit. The communications protocol exchanging circuit is for providing a plurality of local communications protocols to the remote network device, and receiving a remote communications protocol provided by the remote network device, wherein the plurality of local communications protocols include a local standard communications protocol and a local variable-frequency communications protocol. The connection rate control circuit is coupled to the communications protocol exchanging circuit for generating an indicator signal in accordance with the plurality of local communications protocols and the remote standard communications protocol. The connection rate of the variable-frequency network device is determined in accordance with the indicator signal.

The media access controller is coupled to the physical layer circuit for providing packets to the physical layer circuit, and receiving packets that are outputted by the physical layer circuit.

The host interface controller is coupled to the media access controller and is adapted to be coupled to a host interface for receiving data that is outputted by the media access controller and subsequently uploading the data to a host through the host interface, and downloading data from the host through the host interface and subsequently outputting the data to the media access controller.

The variable-frequency clock generator is coupled to the connection rate control circuit. The variable-frequency clock generator operates in one of a standard mode and a variable-frequency mode according to the indicator signal.

In an embodiment of the invention, the variable-frequency clock generator provides a standard clock to the physical layer circuit, the media access controller, and the host interface controller when the indicator signal corresponds to a standard mode, thus causing the variable-frequency network device to operate in accordance with the standard clock, and providing a variable-frequency clock to the physical layer circuit, the media access controller, and the host interface controller when the indicator signal corresponds to a variable-frequency mode, thus causing the variable-frequency network device to operate in accordance with the variable-frequency clock.

In an embodiment of the invention, the variable-frequency network device is a network interface circuit, and the remote network device is one of a network interface circuit and a multi-port network device, such as a hub, a network switch, a gateway, a router, etc.

In an embodiment of the invention, the variable-frequency clock generator can be one that includes a plurality of fixed-frequency clock generators for providing different fixed-frequency clocks.

In an embodiment of the invention, the communications protocol exchanging circuit provides a variable-frequency communications protocol to the remote network device in accordance with an interface transmission rate of the host interface and standard and variable-frequency connection rates that are supported by the variable-frequency network device itself in order to obtain a connection rate that is the same as or similar to the interface transmission rate.

In an embodiment of the invention, the communications protocol exchanging circuit provides a communications protocol to the remote network device only in accordance with standard and variable-frequency connection rates that are supported by the variable-frequency network device itself, and not in accordance with the interface transmission rate of the host interface.

In an embodiment of the invention, when the variable-frequency network device uses increased throughput as a priority consideration, the communications protocol exchanging circuit provides the local standard communications protocol and an overclocking communications protocol to the remote network device. When the variable-frequency network device uses energy savings or long-distance transmission as the priority consideration, the communications protocol exchanging circuit provides the local standard communications protocol and a downclocking communications protocol to the remote network device. When the variable-frequency network device uses establishing a connection at a standard connection rate as the priority consideration, the communications protocol exchanging circuit only provides the local standard communications protocol to the remote network device.

In an embodiment of the invention, the remote network device is capable of but not limited to supporting the following operating conditions: (1) the remote network device provides a standard communications protocol corresponding to a standard connection rate, but is incapable of providing a variable-frequency communications protocol; (2) the remote network device provides a standard communications protocol, corresponding to a standard connection rate and/or an overclocking communications protocol corresponding to an overclocking connection rate, but is incapable of providing a downclocking communications protocol corresponding to a downclocking connection rate; (3) the remote network device provides a standard communications protocol corresponding to a standard connection rate and/or a downclocking communications protocol corresponding to a downclocking connection rate, but is incapable of providing an overclocking communications protocol corresponding to an overclocking connection rate; and (4) the remote network device is capable of supporting the same operating conditions as the variable-frequency network device.

In an embodiment of the invention, to prevent the variable-frequency network device and the remote network device from selecting different communication protocols according to different connection rules, the connection rules that are supported by each of the network devices are exchanged when the network devices exchange communication protocols, so that both of the network devices can use a same connection rule.

According to another aspect of the present invention, there is provided a variable-frequency network connection establishing method adapted for establishing a connection between a local network device and a remote network device. The variable-frequency network connection establishing method includes the following steps.

In step S1, a plurality of local communications protocols are provided to the remote network device by the local network device, the plurality of local communications protocols including a local standard communications protocol and a local variable-frequency communications protocol.

In sub-step S1-1, a connection rule is provided to the remote network device by the local network device.

In step S2, a remote communications protocol that is provided by the remote network device is received by the local network device, the remote communications protocol including a remote standard communications protocol.

In sub-step S2-1, a connection rule that is provided by the remote network device is received by the local network device.

In step S3, an indicator signal is generated by the local network device in accordance with the plurality of local communications protocols and the remote communications protocol received by the local network device.

In step S4, it is determined whether the indicator signal corresponds to a standard mode or a variable-frequency mode.

In step S5, a variable-frequency clock is provided to the local network device when it is determined that the indicator signal corresponds to the variable-frequency mode, thus causing the local network device to operate in accordance with the variable-frequency clock.

In step S6, a standard clock is provided to the local network device when it is determined that the indicator signal corresponds to the standard mode, thus causing the local network device to operate in accordance with the standard clock.

In another embodiment of the present invention, sub-steps S1-1 and S2-1 can be omitted.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
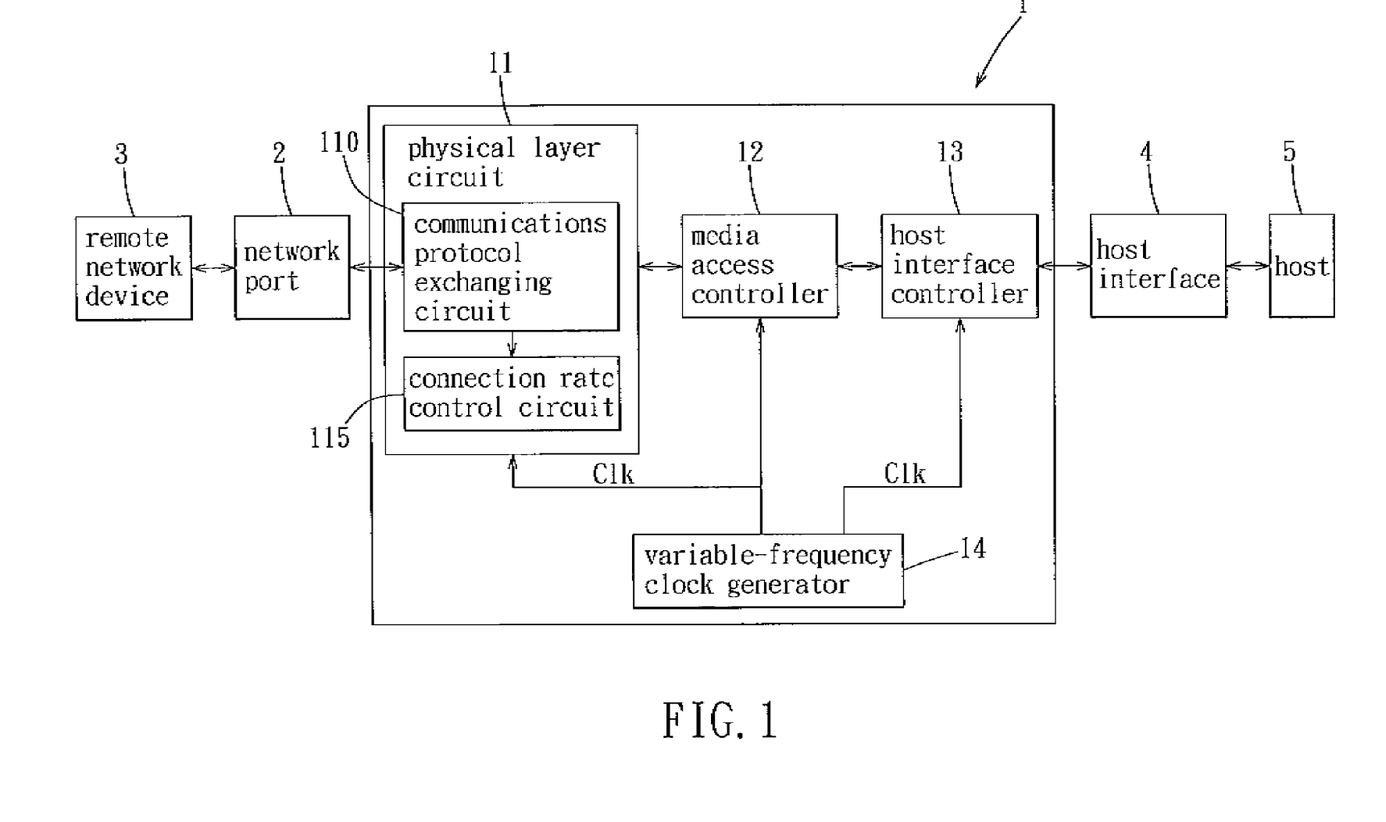
FIG. 1 is a schematic circuit block diagram illustrating a preferred embodiment of a variable-frequency network device according to the present invention.

FIG. 1 illustrates the preferred embodiment of a variable-frequency network device 1 according to the present invention. The variable-frequency network device 1 is adapted for establishing a connection with a remote network device 3 through a network cable, and comprises a physical layer circuit 11, and a variable-frequency clock generator 14. In this embodiment, the variable-frequency network device 1 further includes a media access controller (MAC) 12 and a host interface controller 13.

The physical layer circuit (PHY) 11 transmits packets to the remote network device 3 and receives packets that are outputted by the remote network device 3 through a network port 2, and includes a communications protocol exchanging circuit 110 and a connection rate control circuit 115.

The communications protocol exchanging circuit 110 is for providing a plurality of local communications protocols to the remote network device 3, and receiving at least one remote communications protocol provided by the remote network device 3. The plurality of local communications protocols include at least one local standard communications protocol corresponding to a standard connection rate and at least one local variable-frequency communications protocol corresponding to a variable-frequency connection rate (that is, an overclocking communications protocol corresponding to an overclocking connection rate and/or a downclocking communications protocol corresponding to a downclocking connection rate). The at least one remote communications protocol includes at least one remote standard communications protocol corresponding to a standard connection rate.

The connection rate control circuit 115 is coupled to the communications protocol exchanging circuit 115 for generating an indicator signal in accordance with the plurality of local communications protocols and the at least one remote standard communications protocol. The indicator signal is used to determine the connection rate at which the variable-frequency network device 1 operates. Although the connection rate control circuit 115 is included in the physical layer circuit 11 in this embodiment, the connection rate control circuit 115 can in practice be independent from the physical layer circuit 11.

The media access controller 12 is coupled to the physical layer circuit 11 for generating packets in accordance with digital data and providing the packets to the physical layer circuit 11, and receiving packets that are outputted by the physical layer circuit 11 and generating digital data in accordance with the received packets.

The host interface controller 13 is coupled to the media access controller 12 and is adapted to be coupled to a host interface 4 (such as a PCI Express interface, a PCI interface, a USB interface, a PCMIA interface, an IEEE 1394 interface, or an ISA interface) for receiving data that is outputted by the media access controller 12 and subsequently uploading the data to a host 5 through the host interface 4, and downloading data from the host 5 through the host interface 4 and subsequently outputting the data to the media access controller 12.

The variable-frequency clock generator 14 is coupled to the connection rate control circuit 115 for providing a standard clock to the physical layer circuit 11, the media access controller 12, and the host interface controller 13 when the indicator signal corresponds to a standard mode, thus causing the variable-frequency network device 1 to operate in accordance with the standard clock, and providing a variable-frequency clock (that is, an overclocking clock or a downclocking clock) to the physical layer circuit 11, the media access controller 12, and the host interface controller 13 when the indicator signal corresponds to a variable-frequency mode (that is, an overclocking mode or a downclocking mode), thus causing the variable-frequency network device 1 to operate in accordance with the variable-frequency clock.

It is noted that the above-described overclocking/downclocking modes are overclocking/downclocking versions of a standard mode, and signal code formats corresponding to the overclocking/downclocking modes and the standard mode are substantially similar. For example, when the overclocking/downclocking mode is a mode having a connection rate of 120 Mbps/80 Mbps, and the corresponding standard mode is a mode having a connection rate of 100 Mbps, the signal code formats corresponding to this overclocking/downclocking mode and this standard mode are Multi-Level Transition (MLT-3) signal code formats. On the other hand, when the overclocking/downclocking mode is a mode having a connection rate of 12.5 Mbps/8 Mbps, and the corresponding standard mode is a mode having a connection rate of 10 Mbps, the signal code formats corresponding to this overclocking/downclocking mode and this standard mode are Manchester signal code formats.

In this embodiment, the standard connection mode is one of a 10 Mbps mode, a 100 Mbps mode, a 1 Gbps mode and a 10 Gbps mode. The standard connection rate is one of 10 Mbps, 100 Mbps, 1 Gbps and 10 Gbps, or another specified in an IEEE standard, such as the IEEE 802.3 standard. The standard clock is an operating clock corresponding to a standard connection rate that is supported by both the variable-frequency network device 1 and the remote network device 3.

For instance, when the standard connection rate is 1 Gbps, the corresponding standard clock is 125 MHz. The overclocking clock is an operating clock corresponding to an overclocking connection rate that is supported by both the variable-frequency network device 1 and the remote network device 3. For instance, when the overclocking connection rate is 1.2 Gbps, that is, when an overclocking connection rate that is 120% of the standard connection rate of 1 Gbps is in effect, the corresponding overclocking clock is 125 MHz*120%=150 MHz. The downclocking clock is an operating clock corresponding to a downclocking connection rate that is supported by both the variable-frequency network device 1 and the remote network device 3. For instance, when the downclocking connection rate is 0.8 Gbps, that is, when a downclocking connection rate that is 80% of the standard connection rate of 1 Gbps is in effect, the corresponding downclocking clock is 125 MHz*80%=100 MHz.

In addition, the variable-frequency network device 1 of this embodiment is a network interface circuit (NIC), and the remote network device 3 is a network interface circuit or a multi-port network device, such as a hub, switch, gateway, router, or another network device, though this invention is not limited to such. The variable-frequency clock generator 14 can be one having a phase-locked loop and capable of frequency division using different divisors to generate different clocks, or using a plurality of fixed-frequency clock generators providing different fixed-frequency clocks. It should be noted that when the remote network device 3 is a multi-port network device according to the present invention, each port has a corresponding physical layer circuit, and can either share a media access controller with other ports or use a respective media access controller. This multi-port network device has a processor (such as a central processing unit) for processing data outputted by the media access controller. Moreover, different ports can operate at different connection rates, so that a clock generator for the multi-port network device needs to provide different clocks (standard clocks or variable-frequency clocks) in accordance with the different connection rates at which the different ports operate. The foregoing illustration of the variable-frequency clock generator 14 can be referenced for realization of the clock generator.

Further, in this embodiment, in order to obtain a connection rate that is the same as or similar to an interface transmission rate of the host interface 4 (transmission interface) to which the variable-frequency network device 1 is coupled, the communications protocol exchanging circuit 110 provides a local variable-frequency communications protocol to the remote network device 3 in accordance with the interface transmission rate of the host interface 4 and both the standard and variable-frequency connection rates supported by the variable-frequency network device 1 itself. For instance, if the host interface 4 is a PCI interface having the interface transmission rate of 133 Mbps, and the variable-frequency network device 1 supports the standard and variable-frequency connection rates of 10 Mbps, 100 Mbps, 125 Mbps, 1 Gbps, and 1.25 Gbps, since the variable-frequency connection rate of 125 Mbps is most similar to the interface transmission rate of 133 Mbps, the communications protocol exchanging circuit 110 provides both a variable-frequency communications protocol corresponding to the variable-frequency connection rate of 125 Mbps and a standard communications protocol corresponding to a standard connection rate to the remote network device 3, the latter being provided in case the remote network device 3 does not support the variable-frequency communications protocol. If the host interface 4 is a USB interface having the interface transmission rate of 480 Mbps, and the variable-frequency network device 1 supports the standard connection rates of 10 Mbps, 100 Mbps, and 1 Gbps, and the variable-frequency connection rates of 125 Mbps and 1.25 Gbps, since the standard connection rate of 1 Gbps is the connection rate most similar to that of the host interface 4 that does not restrict the interface transmission rate, the communications protocol exchanging circuit 110 provides the standard communications protocol corresponding to the standard connection rate of 1 Gbps to the remote network device 3. Therefore, one of the local standard communications protocol and the local variable-frequency communications protocol is close to an interface transmission rate of the host interface 4.

In another embodiment of the present invention, the communications protocol exchanging circuit 110 provides the communications protocols to the remote network device 3 only in accordance with the standard and variable-frequency connection rates that are supported by the variable-frequency network device 1 itself, and not in accordance with the interface transmission rate of the host interface 4. However, this embodiment demands a comparatively larger buffer space for temporary storage of data due to a comparatively large difference between the connection rate of the variable-frequency network device 1 and the interface transmission rate of the host interface 4.

Figure 2:
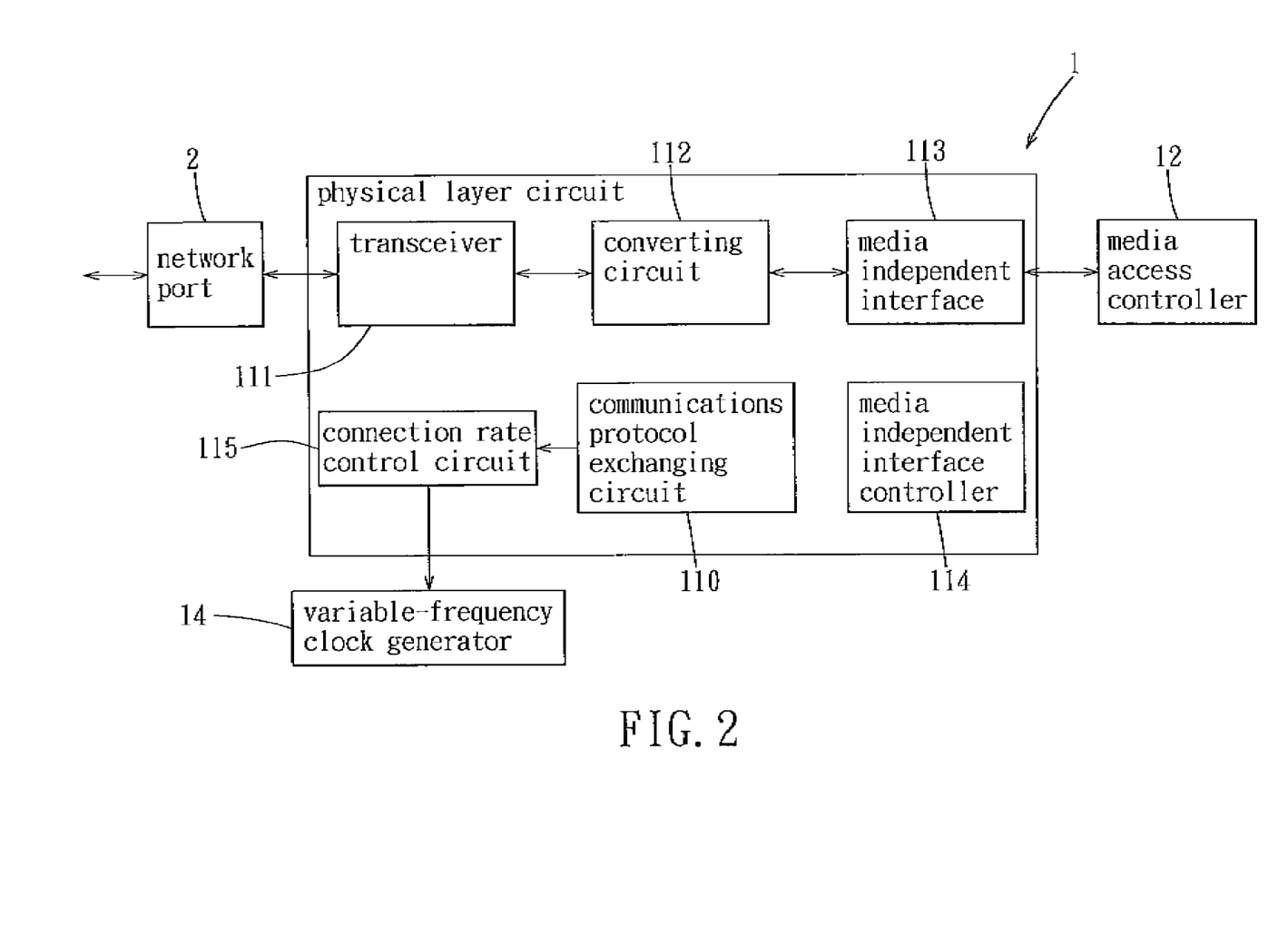
FIG. 2 is a schematic circuit block diagram illustrating a physical layer circuit of the preferred embodiment.

Referring to FIG. 2, the physical layer circuit 11 includes: a transceiver 111 for transmitting and receiving packets; a converting circuit 112 for converting packets that are outputted by the media access controller 12 into signals that are suitable for transmission through a network, and converting signals that are received through the network into packets that the media access controller 12 can process; a media independent interface (MII) 113 serving as a communications interface between the physical layer circuit 11 and the media access controller 12; a media independent interface controller 114 for controlling the media independent interface 113; and the above-described communications protocol exchanging circuit 110 for exchanging communications protocols with the remote network device 3. For an illustration of the manner in which the communications protocols are exchanged, one can refer to the IEEE standard specifications or to U.S. Pat. Nos. RE 39,116 and RE 39,405, such prior art references being readily understood by one skilled in the art. Moreover, realization of the transceiver 111, the converting circuit 112, the media independent interface 113, and the media independent interface controller 14 is detailed in the prior art, and is therefore not described herein.

Referring to FIG. 1, the variable-frequency network device 1 is capable of but not limited to supporting the following operating conditions:

(1) when the variable-frequency network device 1 uses increased throughput as a priority consideration, the communications protocol exchanging circuit 110 of the variable-frequency network device 1 provides a standard communications protocol corresponding to a standard connection rate and an overclocking communications protocol corresponding to an overclocking connection rate to the remote network device 3;

(2) when the variable-frequency network device 1 uses energy savings or long-distance transmission as the priority consideration, the communications protocol exchanging circuit 110 of the variable-frequency network device 1 provides a standard communications protocol corresponding to a standard connection rate and a downclocking communications protocol corresponding to a downclocking connection rate to the remote network device 3; and (3) when the variable-frequency network device 1 uses establishing a connection in a standard mode as the priority consideration, the communications protocol exchanging circuit 110 of the variable-frequency network device 1 only provides a standard communications protocol corresponding to a standard connection rate to the remote network device 3.

In this embodiment, the host 5 determines the priority consideration. The host 5 can both determine the priority consideration and inform the variable-frequency network device 1 of the priority consideration to be used through executing a driver program of the variable-frequency network device 1. Moreover, if the remote network device 3 is a multi-port network device including a processing unit, such as a central processing unit, then the processing unit can determine and inform the remote network device 3 of the priority consideration to be used. In another embodiment of the present invention, the variable-frequency network device 1 determines the priority consideration according to computation performed by firmware and/or a logic circuit (not shown in the Figures).

Furthermore, the remote network device 3 is capable of but not limited to supporting the following operating conditions:

(1) when the remote network device 3 is a conventional network device, the remote network device 3 provides only a standard communications protocol corresponding to a standard connection rate, and is incapable of providing a variable-frequency communications protocol;

(2) when the remote network device 3 is a network device that supports an overclocking connection rate of the present invention, the remote network device 3 provides a standard communications protocol corresponding to a standard connection rate and/or an overclocking communications protocol corresponding to an overclocking connection rate, but is incapable of providing a downclocking communications protocol corresponding to a downclocking connection rate;

(3) when the remote network device 3 is a network device that supports a downclocking connection rate of the present invention, the remote network device 3 provides a standard communications protocol corresponding to a standard connection rate and/or a downclocking communications protocol corresponding to a downclocking connection rate, but is incapable of providing an overclocking communications protocol corresponding to an overclocking connection rate; and (4) when the remote network device 3 is a network device that is capable of supporting both the overclocking and downclocking connection rates of the present invention, the remote network device 3 is capable of supporting the same operating conditions as the variable-frequency network device 1.

In other words, when the variable-frequency clock generator 14 is operating in the variable-frequency mode, the remote communications protocol comprises a remote standard communications protocol and a remote variable-frequency communications protocol, the remote standard communications protocol comprising 10 Mbps, 100 Mbps, 1 Gbps and 10 Gbps connection rates, the remote variable-frequency communications protocol excluding 10 Mbps, 100 Mbps, 1 Gbps and 10 Gbps connection rates.

In view of the operating conditions described above, the variable-frequency network device 1 and the remote network device 3 are each operable in one of many types of operating conditions, and thus the two network devices 1, 3 are capable of cooperatively establishing many types of connections. In order to determine which communications protocol is to be used for establishing a connection, the two network devices 1,3 use a same connection rule. The connection rules can be stored in the variable-frequency network device 1 and the remote network device 3, or be loaded upon power-on from another source, such as a host, or provided instantly on request from another source, again such as a host. The connection rules include but are not limited to at least one of the following three connection rules.

(1) In accordance with the first connection rule, the variable-frequency network device 1 and the remote network device 3 select a communications protocol from the communications protocols they have provided one another that corresponds to a highest connection rate that both of the network devices 1,3 are capable of supporting. The highest connection rate can be a standard connection rate or a variable-frequency connection rate. For instance, if the variable-frequency network device provides communications protocols to the remote network device 3 corresponding to 1.25 Gbps, 1.2 Gbps, 1 Gbps, 125 Mbps, 100 Mbps, and 10 Mbps connection rates, and the remote network device 3 provides communications protocols to the variable-frequency network device 1 corresponding to the 1.5 Gbps, 1.2 Gbps, 1 Gbps, 100 Mbps and 10 Mbps connection rates, then the network devices 1,3 both support communications protocols corresponding to the 1.2 Gbps, 1 Gbps, 100 Mbps, and 10 Mbps connection rates, wherein the highest one of these connection rates is 1.2 Gbps. Therefore, the network devices 1,3 select the communications protocol corresponding to the 1.2 Gbps connection rate for establishing a connection;

(2) In accordance with the second connection rule, the variable-frequency network device 1 and the remote network device 3 select a communications protocol from the communications protocols they have provided one another that corresponds to a lowest connection rate that both of the network devices 1,3 are capable of supporting. The lowest connection rate can be a standard connection rate or a variable-frequency connection rate. For instance, if the variable-frequency network device 1 provides communications protocols corresponding to 1 Gbps, 800 Mbps, 100 Mbps, 80 Mbps, and 10 Mbps connection rates to the remote network device 3, and the remote network device 3 provides communications protocols corresponding to 1 Gbps, 800 Mbps, 100 Mbps, and 80 Mbps connection rates to the variable-frequency network device 1, then the network devices 1,3 both support the communications protocols corresponding to the 1 Gbps, 800 Mbps, 100 Mbps, and 80 Mbps connection rates, wherein the lowest one of these connection rates is 80 Mbps. Therefore, the network devices 1,3 select the communications protocol corresponding to the 80 Mbps connection rate for establishing a connection; and (3) In accordance with the third connection rule, the variable-frequency network device 1 and the remote network device 3 select a communications protocol that both are capable of supporting according to a predetermined priority sequence. For instance, when the predetermined priority sequence is a sequence of connection rates of 1.25 Gbps>1.2 Gbps>1.5 Gbps>1 Gbps 0.8 Gbps 125 Mbps>100 Mbps>80 Mbps>10 Mbps, and the variable-frequency network device 1 provides communications protocols to the remote network device 3 that correspond to connection rates of 1.5 Gbps, 1.2 Gbps, 1 Gbps, 125 Mbps, 100 Mbps, and 10 Mbps, and the remote network device 3 provides communications protocols to the variable-frequency network device 1 that correspond to connection rates of 1.5 Gbps, 1.2 Gbps, 1 Gbps, 100 Mbps, and 10 Mbps, then the two network devices 1, 3 both support communications protocols corresponding to the connection rates of 1.5 Gbps, 1.2 Gbps, 1 Gbps, 100 Mbps, and 10 Mbps, wherein the connection rate having the highest priority is 1.2 Gbps. Therefore, the two network devices 1,3 select the communication protocol corresponding to the 1.2 Gbps connection rate for establishing a connection. It should be noted that the predetermined priority sequence can be determined not only based on the degree of power consumption, but also on any other factor deemed appropriate by one skilled in the art.

After the variable-frequency network device 1 and the remote network device 3 select a communications protocol (which corresponds to either a standard connection rate or a variable-frequency connection rate) to be used in accordance with the same connection rule, the connection rate control circuit 115 provides the indicator signal to the variable-frequency clock generator 14 in accordance with the selected communication protocol. The variable-frequency clock generator 14 then provides the clock (standard or variable-frequency clock) to the physical layer circuit 11, the media access controller 12, and the host interface controller 13 in accordance with the mode (the standard or variable-frequency mode) corresponding to the indicator signal, thus causing the variable-frequency network device 1 to operate at a connection rate corresponding to the selected communications protocol in accordance with the clock. It is worth noting that different modes corresponding to different indicator signals can be represented by different signal strengths or different signal logic values.

In addition, when there are a plurality of the connection rules, in order to prevent the variable-frequency network device 1 and the remote network device 3 from following different connection rules and consequently selecting different communications protocols, the connection rules that are supported by each of the network devices 1,3 can be exchanged (and subsequently merged to form a common subset) when the network devices 1,3 exchange communications protocols, so that the network devices 1,3 can use the same connection rule. In this embodiment, the connection rules are included in signals that are loaded with the communication protocols, though this invention is not limited to such.

Figure 3:
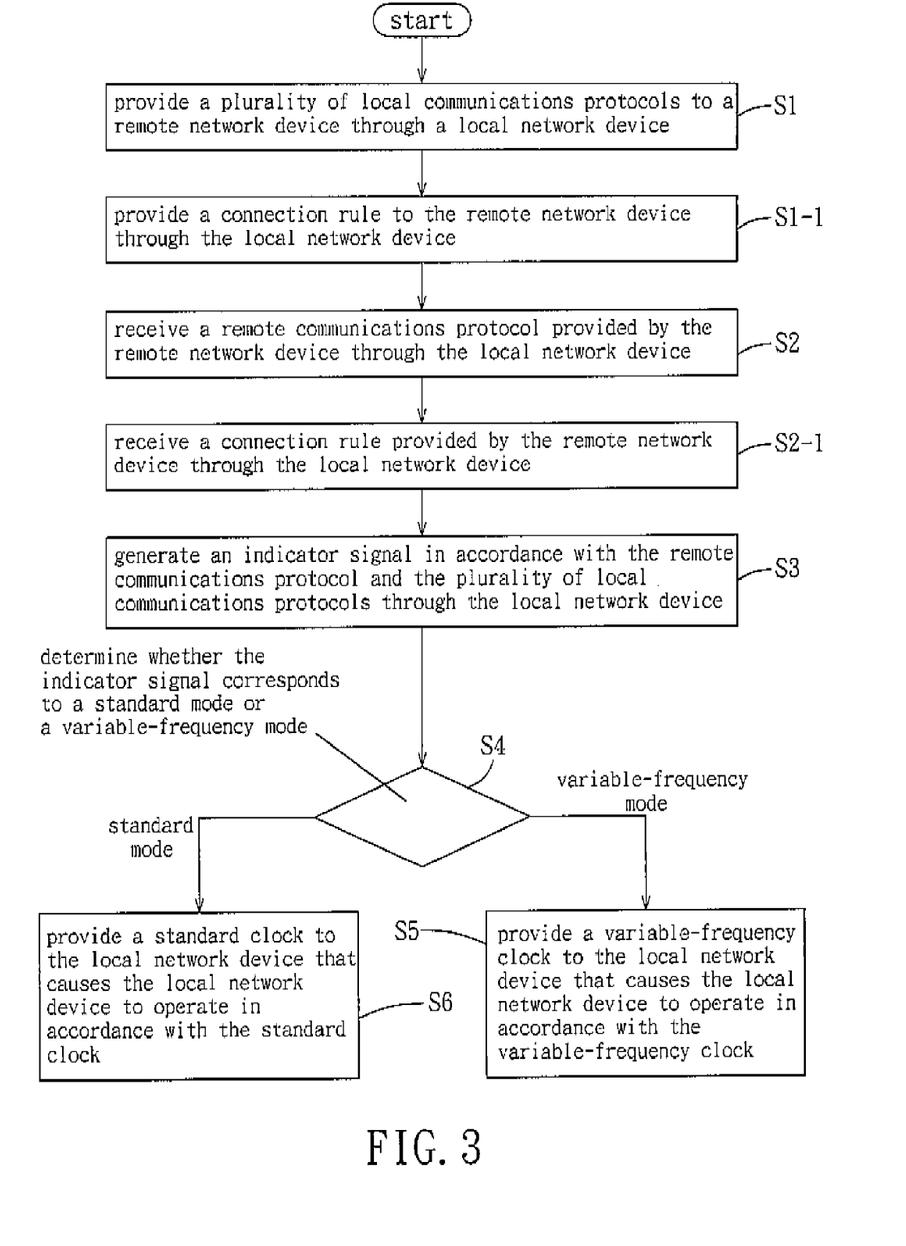
FIG. 3 is a flowchart of a preferred embodiment of a variable-frequency network connection establishing method according to the present invention.

Referring to FIG. 3, the preferred embodiment of a variable-frequency network connection establishing method according to the present invention includes the following steps.

In step S1, a plurality of local communications protocols are provided to a remote network device (such as the remote network device 3 shown in FIG. 1) by a local network device (such as the variable-frequency device 1 shown in FIG. 1), the plurality of local communications protocols including at least one local standard communications protocol and at least one local variable-frequency communications protocol. Please refer to the foregoing for an explanation of the local standard communications protocols and the local variable-frequency communications protocols.

In sub-step S1-1, at least one connection rule is provided to the remote network device by the local network device. Please refer to the foregoing for an explanation of the connection rules. In another embodiment of the present invention, sub-step S1-1 can be omitted.

In step S2, at least one remote communications protocol that is provided by the remote network device is received by the local network device, the at least one remote communications protocol including at least one remote standard communications protocol.

In sub-step S2-1, at least one connection rule that is provided by the remote network device is received by the local network device. In another embodiment of the present invention, sub-step S2-1 can be omitted.

In step S3, an indicator signal is generated by the local network device in accordance with the plurality of local communications protocols and the at least one remote communications protocols received from the remote network device. Please refer to the foregoing for an explanation of the indicator signal.

In step S4, it is determined whether the indicator signal corresponds to a standard mode or a variable-frequency mode. Please refer to the foregoing for an explanation of the standard mode and the variable-frequency mode.

In step S5, a variable-frequency clock is provided to the local network device when it is determined that the indicator signal corresponds to the variable-frequency mode, thus causing the local network device to operate in accordance with the variable-frequency clock. Please refer to the foregoing for an explanation of the variable-frequency clock.

In step S6, a standard clock is provided to the local network device when it is determined that the indicator signal corresponds to the standard mode, thus causing the local network device to operate in accordance with the standard clock. Please refer to the foregoing for an explanation of the standard clock.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A variable-frequency network device for establishing a connection with a remote network device, the variable-frequency network device comprising:
   a physical layer circuit for transmitting packets to the remote network device and receiving packets that are outputted by the remote network device, the physical layer circuit including:
   a communications protocol exchanging circuit for providing a plurality of local communications protocols to the remote network device, and receiving a remote communications protocol provided by the remote network device, wherein the plurality of local communications protocols include a local standard communications protocol and a local variable-frequency communications protocol; and
   a connection rate control circuit coupled to the communications protocol exchanging circuit for generating an indicator signal in accordance with the plurality of local communications protocols and the remote communications protocol; and
   a variable-frequency clock generator, coupled to the connection rate control circuit, the variable-frequency clock generator operating in one of a standard mode and a variable-frequency mode according to the indicator signal;
   wherein the standard mode is one of a 10 Mbps mode, a 100 Mbps mode, a 1 Gbps mode and a 10 Gbps mode, and the variable-frequency mode is a mode that excludes a 10 Mbps mode, a 100 Mbps mode, a 1 Gbps mode and a 10 Gbps mode.

2. The variable-frequency network device as claimed in claim 1, wherein the variable-frequency clock generator provides a standard clock to the physical layer circuit when the indicator signal corresponds to a standard mode, thus causing the variable-frequency network device to operate in accordance with the standard clock, and provides a variable-frequency clock to the physical layer circuit when the indicator signal corresponds to a variable-frequency mode, thus causing the variable-frequency network device to operate in accordance with the variable-frequency clock.

3. The variable-frequency network device as claimed in claim 1, wherein when the variable-frequency clock generator is operating in the variable-frequency mode, the remote communications protocol comprises a remote standard communications protocol and a remote variable-frequency communications protocol, the remote standard communications protocol comprising 10 Mbps, 100 Mbps, 1 Gbps and 10 Gbps connection rates, the remote variable-frequency communications protocol excluding 10 Mbps, 100 Mbps, 1 Gbps and 10 Gbps connection rates.

4. The variable-frequency network device as claimed in claim 1, wherein the variable-frequency mode is an overclocking mode, the variable-frequency clock is an overclocking clock, the overclocking mode is an overclocking version of the standard mode, signal code formats corresponding to the overclocking mode and the standard mode are the same.

5. The variable-frequency network device as claimed in claim 1, wherein the variable-frequency mode is a downclocking mode, the variable-frequency clock is a downclocking clock, the downclocking mode is a downclocking version of the standard mode, signal code formats corresponding to the downclocking mode and the standard mode are the same.

6. The variable-frequency network device as claimed in claim 1, further comprising: a media access controller coupled to the physical layer circuit for providing packets to the physical layer circuit, and receiving packets that are outputted by the physical layer circuit; and a host interface controller coupled to the media access controller and adapted to be coupled to a host interface for receiving data that is outputted by the media access controller and subsequently uploading the data to a host through the host interface, and downloading data from the host through the host interface and subsequently outputting the data to the media access controller; wherein one of the local standard communications protocol and the local variable-frequency communications protocol is close to an interface transmission rate of the host interface.

7. The variable-frequency network device as claimed in claim 6, wherein the host interface is one of a PCI interface, a PCI-E interface, a USB interface, a PCMCIA interface, an IEEE 1394 interface, and an ISA interface.

8. The variable-frequency network device as claimed in claim 1, wherein the communications protocol exchanging circuit provides a connection rule to the remote network device, and the connection rate control circuit generates the indicator signal in accordance with the connection rule, the remote communications protocol, and the plurality of local communications protocols.

9. The variable-frequency network device as claimed in claim 1, wherein the communications protocol exchanging circuit provides the local standard communications protocol and a overclocking communications protocol to the remote network device, wherein an overclocking clock corresponding to the overclocking communications protocol is higher than a standard clock corresponding to the local standard communications protocol.

10. The variable-frequency network device as claimed in claim 9, wherein:
    when the variable-frequency network device uses energy savings or long-distance transmission as the priority consideration, the communications protocol exchanging circuit provides the local standard communications protocol and a downclocking communications protocol to the remote network device, wherein a downclocking clock corresponding to the downclocking communications protocol is lower than the standard clock corresponding to the local standard communications protocol.

11. The variable-frequency network device as claimed in claim 1, wherein the communications protocol exchanging circuit provides the plurality of local communications protocols to the remote network device in accordance with a priority consideration, and wherein when the variable-frequency network device uses energy savings or long-distance transmission as the priority consideration, the communications protocol exchanging circuit provides the local standard communications protocol and a downclocking communications protocol to the remote network device, wherein a downclocking clock corresponding to the downclocking communications protocol is lower than a standard clock corresponding to the local standard communications protocol.

12. A variable-frequency network connection establishing method for establishing a connection between a local network device and a remote network device, the variable-frequency network connection establishing method comprising the steps of:

providing a plurality of local communications protocols to the remote network device, the plurality of local communications protocols including a local standard communications protocol and a local variable-frequency communications protocol, wherein the local standard communications protocol corresponds to one of a 10 Mbps mode, a 100 Mbps mode, a 1 Gbps mode, and a 10 Gbps mode;

receiving a remote communications protocol provided by the remote network device;

generating an indicator signal in accordance with the remote communications protocol and the plurality of local communications protocols; and operating in one of a standard mode and a variable-frequency mode according to the indicator signal;

wherein the standard mode is one of a 10 Mbps mode, a 100 Mbps mode, a 1 Gbps mode, and a 10 Gbps mode, and the variable-frequency mode is a mode that excludes a 10 Mbps mode, a 100 Mbps mode, a 1 Gbps mode, and a 10 Gbps mode.

13. The variable-frequency network connection establishing method as claimed in claim 12, wherein the step of receiving a remote communications protocol provided by the remote network device comprises:

receiving a remote standard communications protocol and a remote variable-frequency communications protocol, the remote standard communications protocol comprising 10 Mbps, 100 Mbps, 1 Gbps and 10 Gbps connection rates, the remote variable-frequency communications protocol excluding 10 Mbps, 100 Mbps, 1 Gbps and 10 Gbps connection rates.

14. The variable-frequency network connection establishing method as claimed in claim 12, further comprising the steps of:

providing a standard clock to the local network device when the indicator signal corresponds to the standard mode, thus causing the local network device to operate in accordance with the standard clock; and providing a variable-frequency clock to the local network device when the indicator signal corresponds to the variable-frequency mode, thus causing the local network device to operate in accordance with the variable-frequency clock.

15. The variable-frequency network connection establishing method as claimed in claim 12, wherein the remote communications protocol includes a remote standard communications protocol, and the remote standard communications protocol corresponds to one of a 10 Mbps mode, a 100 Mbps mode, a 1 Gbps mode, and a 10 Gbps mode.

16. The variable-frequency network connection establishing method as claimed in claim 12, wherein the variable-frequency mode is an overclocking mode, the variable-frequency clock is an overclocking clock, the overclocking mode is an overclocking version of the standard mode, and signal code formats corresponding to the overclocking mode and the standard mode are the same.

17. The variable-frequency network connection establishing method as claimed in claim 12, wherein the variable-frequency mode is a downclocking mode, the variable-frequency clock is a downclocking clock, the downclocking mode is a downclocking version of the standard mode, and signal code formats corresponding to the downclocking mode and the standard mode are the same.

18. The variable-frequency network connection establishing method as claimed in claim 12, further comprising:

receiving and processing data sent from the remote network device, and uploading the data to a host through a host interface;

wherein one of the local standard communications protocol and the local variable-frequency communications protocol is close to an interface transmission rate of the host interface.

19. The variable-frequency network connection establishing method as claimed in claim 12, further comprising:

providing a connection rule to the remote network device, the indicator signal being generated in accordance with the connection rule, the remote communications protocol, and the plurality of local communications protocols.

20. The variable-frequency network connection establishing method as claimed in claim 12, wherein, in the step of providing the plurality of local communications protocols to the remote network device, the local standard communications protocol and an overclocking communications protocol are provided to the remote network device, wherein an overclocking clock corresponding to the overclocking communications protocol is higher than a standard clock corresponding to the local standard communications protocol.

21. The variable-frequency network connection establishing method as claimed in claim 12, wherein, in the step of providing the plurality of local communications protocols to the remote network device, the local standard communications protocol and a downclocking communications protocol are provided to the remote network device when the local network device uses energy savings or long-distance transmission as a priority consideration, wherein a downclocking clock corresponding to the downclocking communications protocol is lower than a standard clock corresponding to the local standard communications protocol.

22. A variable-frequency network device for establishing a connection with a remote network device through a network cable, the variable-frequency network device comprising:

a physical layer circuit for transmitting packets to the remote network device and receiving packets that are outputted by the remote network device, the physical layer circuit including:

a communications protocol exchanging circuit for providing at least one local communications protocol to the remote network device in accordance with a priority consideration, wherein: when the variable-frequency network device uses increased throughput as the priority consideration, the communications protocol exchanging circuit provides a local standard communications protocol and an overclocking communications protocol to the remote network device, and receives a remote communications protocol provided by the remote network device, wherein a connection rate corresponding to the overclocking communications protocol is greater than the connection rate corresponding to the local standard communications protocol; and when the variable-frequency network device uses establishing a connection at a standard connection rate as the priority consideration, the communications protocol exchanging circuit only provides the local standard communications protocol to the remote network device, and receives the remote communications protocol provided by the remote network device, wherein the standard connection rate is one of a 10 Mbps mode, a 100 Mbps mode, a 1 Gbps mode and a 10 Gbps mode; and a connection rate control circuit coupled to the communications protocol exchanging circuit for generating an indicator signal in accordance with the communications protocol provided by the communications protocol exchanging circuit and the remote communications protocol; and a variable-frequency clock generator coupled to the connection rate control circuit for providing a standard clock to the physical layer circuit when the indicator signal corresponds to a standard mode, thus causing the variable-frequency network device to operate in accordance with the standard clock, and providing an overclocking clock to the physical layer circuit when the indicator signal corresponds to an overclocking mode, thus causing the variable-frequency network device to operate in accordance with the overclocking clock;

wherein the standard mode is one of a 10 Mbps mode, a 100 Mbps mode, a 1 Gbps mode and a 10 Gbps mode, and the overclocking mode is a mode that excludes a 10 Mbps mode, a 100 Mbps mode, a 1 Gbps mode and a 10 Gbps mode.

23. The variable-frequency network device as claimed in claim 22, wherein the overclocking mode is an overclocking version of a first standard mode, signal code formats corresponding to the overclocking mode and the first standard mode are substantially similar, and the first standard mode is one of a 10 Mbps mode, a 100 Mbps mode, a 1 Gbps mode, and a 10 Gbps mode.

24. The variable-frequency network device as claimed in claim 22, wherein:

when the variable-frequency network device uses energy savings or long-distance transmission as the priority consideration, the communications protocol exchanging circuit provides the local standard communications protocol and a downclocking communications protocol to the remote network device, and receives the remote communications protocol provided by the remote network device, wherein a connection rate corresponding to the downclocking communications protocol is less than the connection rate corresponding to the local standard communications protocol; and when the indicator signal corresponds to a downclocking mode, the variable-frequency clock generator provides a downclocking clock to the physical layer circuit, thus causing the variable-frequency network device to operate in accordance with the downclocking clock.

25. The variable-frequency network device as claimed in claim 24, wherein the downclocking mode is a downclocking version of a second standard mode, signal code formats corresponding to the downclocking mode and the second standard mode are substantially similar, and the second standard mode is one of a 10 Mbps mode, a 100 Mbps mode, a 1 Gbps mode, and a 10 Gbps mode.

26. The variable-frequency network device as claimed in claim 22, further comprising: a media access controller coupled to the physical layer circuit for providing packets to the physical layer circuit, and receiving packets that are outputted by the physical layer circuit; and a host interface controller coupled to the media access controller and adapted to be coupled to a host interface for receiving data that is outputted by the media access controller and subsequently uploading the data to a host through the host interface, and downloading data from the host through the host interface and subsequently outputting the data to the media access controller; wherein the overclocking communications protocol is related to an interface transmission rate of the host interface.

27. A variable-frequency network device for establishing a connection with a remote network device through a network cable, the variable-frequency network device comprising: a physical layer circuit for transmitting packets to the remote network device and receiving packets that are outputted by the remote network device, the physical layer circuit including: a communications protocol exchanging circuit for providing a local communications protocol to the remote network device in accordance with a priority consideration, wherein when the variable-frequency network device uses energy savings or long-distance transmission as the priority consideration, the communications protocol exchanging circuit provides a local standard communications protocol and a downclocking communications protocol to the remote network device, and receives a remote communications protocol provided by the remote network device, wherein a connection rate corresponding to the downclocking communications protocol is less than the connection rate corresponding to the local standard communications protocol, and when the variable-frequency network device uses establishing a connection at a standard connection rate as the priority consideration, the communications protocol exchanging circuit only provides the local standard communications protocol to the remote network device, and receives the remote communications protocol provided by the remote network device, wherein the standard connection rate is one of a 10 Mbps mode, a 100 Mbps mode, a 1 Gbps mode and a 10 Gbps mode; and a connection rate control circuit coupled to the communications protocol exchanging circuit for generating an indicator signal in accordance with the communications protocol provided by the communications protocol exchanging circuit and the remote communications protocol; and a variable-frequency clock generator coupled to the connection rate control circuit for providing a standard clock to the physical layer circuit when the indicator signal corresponds to a standard mode, thus causing the variable-frequency network device to operate in accordance with the standard clock, and providing a downclocking clock to the physical layer circuit when the indicator signal corresponds to a downclocking mode, thus causing the variable-frequency network device to operate in accordance with the downclocking clock; wherein the standard mode is one of a 10 Mbps mode, a 100 Mbps mode, a 1 Gbps mode and a 10 Gbps mode, and the downclocking mode is a mode that excludes a 10 Mbps mode, a 100 Mbps mode, a 1 Gbps mode and a 10 Gbps mode.

28. The variable-frequency network device as claimed in claim 27, wherein the downclocking mode is a downclocking version of a second standard mode, signal code formats corresponding to the downclocking mode and the second standard mode are substantially similar, and the second standard mode is one of a 10 Mbps mode, a 100 Mbps mode, a 1 Gbps mode, and a 10 Gbps mode.

29. The variable-frequency network device as claimed in claim 27, further comprising:
- a media access controller coupled to the physical layer circuit for providing packets to the physical layer circuit, and receiving packets that are outputted by the physical layer circuit; and
- a host interface controller coupled to the media access controller and adapted to be coupled to a host interface for receiving data that is outputted by the media access controller and subsequently uploading the data to a host through a host interface, and downloading data from the host through the host interface and subsequently outputting the data to the media access controller;
- wherein the downclocking communications protocol is close to an interface transmission rate of the host interface.

* * * * *